3,560,236
METHOD AND COMPOSITION FOR PREFER-
ENTIALLY GLAZING CERAMIC BODIES
William H. Orth, Baltimore, Md., assignor to
SCM Corporation, Cleveland, Ohio
No Drawing. Filed Dec. 30, 1968, Ser. No. 788,058
Int. Cl. B44d 1/52, 3/20
U.S. Cl. 117—5.5    4 Claims

ABSTRACT OF THE DISCLOSURE

This application discloses a method and composition for preferentially glazing predetermined areas of unfired (green) or fired ceramic articles. Those areas of the ceramic article that are to remain unglazed are coated with a film of substantially combustible, discrete (non-coalescing), hydrophobic particles prior to the application of an aqueous glazing slip. The aqueous glazing slip is then applied to the article by dip, spray, brushing, flow-coat, or waterfall methods and the slip adheres only to those areas which are not hydrophobically coated. The resulting body is then fired to fuse or mature the glaze and burn away the hydrophobic coating.

The invention makes possible the use of the waterfall method of applying aqueous glazing slip to unfired shaped (e.g., pressed, extruded, etc.) ceramic bodies which are to be preferentially glazed on the planar surface and not the edges thereof.

---

This invention relates to the manufacture of glazed ceramic articles, and more particularly to improvements in a conventional process wherein an aqueous glazing slip is preferentially applied to a fired or unfired ceramic body.

In the ceramic industry today there is a glazing technique known as the "waterfall" technique wherein a stream or "waterfall" of aqueous glazing slip flows over the body to be glazed. This waterfall technique produces a glaze superior in uniformity and gloss to glazes produced by other glazing techniques such as spraying or dipping. One industrially significant embodiment of the present invention provides a method for using this waterfall glazing method in glazing unfired shaped clay bodies, such as pressed or extruded tiles or bricks, whereby the clay body can be preferentially glazed and fired by the "one fire" process.

In industrial practice there are two techniques for firing and glazing formed ceramic bodies. The older technique known as the "two fire" technique, no longer popular in the United States although it is widely used in Europe, involves two firing steps; the first to mature the formed ceramic body and the second to mature the glaze. Because of the two firing steps employed, the process is economically undesirable.

In this two fire technique as practiced in conjunction with the waterfall glazing method, the formed clay body is first fired in a furnace or kiln and then contacted with a flowing stream of glazing slip which splashes over the surface of the bisque body and deposits a slip coating thereon. The coated bisque body is again fired to convert the slip coating to a glazed ceramic surface. When the shaped clay article is planar (e.g., ceramic tile or brick) it is generally desirable to glaze only the planar surface because the glazing of the edges of these articles causes poor alignment of the spacer lugs and prevents adhesion of the mortar or grout used to cement the tile or brick in place. Unfortunately, when the aqueous glazing slip flows over the shaped, planar, fired, clay body, an overrun deposit of slip invariable accumulates on the edges and underside of the body. This deposit must be mechanically removed from the edges and underside prior to glaze firing the slip coated body, in order that ceramic articles having unglazed edges and underside be formed. Since the body has already been fired before the glaze is applied, it has sufficient strength to structurally withstand the mechanical removal of these overrun deposits.

In the second technique for firing and glazing formed ceramic bodies, the glaze is applied to the formed (but unfired) ceramic body and the ceramic composite is fired to mature the body and fuse the glaze. This technique is known as the "one fire" technique and is widely used in the United States because of its economic desirability. Unfortunately, when an unfired, shaped, clay body is subjected to the waterfall method of applying the glaze slip, the unfired formed body is often physically damaged during the removal of the overrun deposits from the edges due to the frangible nature of the green body. It is apparent, then, that a substantial contribution to the art would be realized by the provision of a method for practicing the waterfall glazing method in conjunction with the "one fire" process.

In my commonly assigned, copending application, S.N. 657,789, filed Aug. 2, 1967, now Pat No. 3,502,496 is disclosed a coating method for strengthening an unfired clay body so that overrun deposits of slip can be mechanically removed without damage to the body. This copending application discloses a method for providing a hydrophilic coating on those areas of the body which are to remain unglazed. The overrunning glaze slip then adheres to this hydrophilic coating. The adhering glaze slip is then mechanically removed from the edge of the body prior to firing. According to this copending application, the hydrophilic coating is hardened by drying before the glaze slip is applied.

In the past, attempts have also been made to prevent overrun deposits of glaze slip from accumulating on the edges of unfired pressed clay articles by coating the edges of the green, formed, clay article with glaze slip repellant materials such as paraffin or microcrystalline wax to eliminate the necessity of mechanically removing the overrun deposit. This was accomplished either by coating the edge with the wax in the molten state or by coating the edge with an aqueous emulsion of this wax. Such procedures have been found generally unacceptable because the molten wax was difficult to handle and apply, and the aqueous emulsion vehicle had a tendency to "slake" or dilute the unfired clay body and dimensional stability is not maintained. Additionally, in the case of tile glazing, the spacing lugs and the tile edges were generally weakened or dissolved by the aqueous emulsion vehicle. Consequently, when the body is subsequently fired, dimensional irregularities, and surface defects are present in those areas slaked by the aqueous vehicle.

To overcome this "slaking" problem, solutions of hydrophobic materials in non-aqueous solvents have been employed. These techniques have been generally unacceptable because the treating solutions have a tendency to permeate the porous clay body upon application. When the body is then fired, the hydrophobic materials decompose within the body causing undesirable surface blemishes and defects.

The present invention provides a method and composition for preventing the accumulation of overrun glaze deposits on green bodies without detracting from the dimensional stability. It will be understood that the present invention can be practiced in conjunction with the "two fire" process although maximum economic benefit is derived when practiced in conjunction with the "one fire" method.

According to the present invention a mixture of finely divided substantially combustible, discrete, hydrophobic particles in a fugitive non-aqueous vehicle is applied to those surface areas of the fired or unfired shaped ceramic body that are to remain unglazed. This application deposits an accumulation coating of discrete, substantially combustible, hydrophobic particles to which the aqueous glazing slip will not adhere.

The term "hydrophobic particle" has been used above and refers to particles which are not wet by water or are water repellent. Typically, the hydrophobic particles are water insoluble fatty acid soap particles. The term "accumulation coating" as used herein refers to that coating formed by the accumulation of discrete or non-coalescing particles on the surface of the fired or unfired ceramic body. The term does not include integral coating films formed by fusion or coalescence.

While not intending to be bound by any theory, it is believed that an accumulation coating forms on the porous ceramic body because discrete hydrophic particles become entrapped in surface pores and capillary openings. In any event the hydrophobic particles do not appear to permeate the fired or unfired ceramic bodies.

The term "fugitive, non-aqueous liquid vehicle" is used to describe the carrier for the hydrophobic particles. The vehicle must be non-aqueous so it will not have the tendency to dilute or slake unfired clay bodies. Preferably, the vehicle is water immiscible. The vehicle should also be fugitive or volatile and readily vaporized from the clay body during the glaze firing step. Usually the vehicle is sufficiently fugitive to vaporize at room temperature. Vehicles having boiling point temperatures (or a final distillation range temperature or dry point temperature not substantially in excess of 500° F.) are suitable for this purpose.

Typical vehicles include various fugitive hydrocarbons that are normally liquids at room temperature and pressure. These solvents can be aromatic hydrocarbons such as toluene, xylene, benzene, methyl benzene and the like; aliphatic hydrocarbons such as pentane, hexane, octane, 2-methyl hexane, 3-methyl pentane, 2,2-dimethyl butane and the like; naphthene hydrocarbons such as cyclopentane, methyl cyclobutane, cyclohexane, methyl cyclopentane, ethyl cyclobutane, trimethyl cyclopropane, cycloheptane, methyl cyclohexane and the like; olefinic hydrocarbons such as 1-hexene, 2-methyl 1-pentene, 2-ethyl 1-butene, 1 heptene, 3-methyl 2-pentene, 1-octene, dimethyl pentene and the like; unsaturated naphthene hydrocarbons such as cyclohexene, cyclopentene, ethyl cyclopentene, 1, 2,3-trimethyl cyclopentene-1, and the like; and mixtures of the hydrocarbon solvents having a distillation range rather than a definite boiling point such as the petroleum distillate fractions (e.g., naphtha, mineral spirits and kerosene) having a final distillation temperature (dry point) ranging from 150° F. and lower to 500° F. and higher. The lower boiling vehicles are, of course, preferred although the higher boiling vehicles can be used since they will readily volatilize while the body is being heated to fire the glaze.

The term "mixture" has been used above and refers to a slurry, suspension or dispersion of finely divided insoluble hydrophobic particles in a fugitive non-aqueous vehicle. If the particles are relatively coarse (i.e., about 1 to 15 microns and above) the mixture is referred to as a slurry. When the particles are fine and non-settling (i.e., less than about 1 micron), the mixture is referred to as a suspension or dispersion.

Preferably, for efficiency and economy, the mixture is a slurry or dispersion of a saturated or unsaturated $C_{12}$–$C_{26}$ monocarboxylic acid soap in a volatile organic vehicle. Usually, the monocarboxylic acid soap is a fatty acid soap (or mixtures of fatty acid soaps). The concentration of monocarboxylic acid soap usually ranges from about 1% by weight to 60% by weight in the vehicle. At concentrations below about 1%, the application of too much vehicle is required to deposit the coating, at concentrations above 60% the mixture is often too thick to handle.

The monocarboxylic acid soaps employed are usually the saturated and unsaturated fatty acid soaps such as lauric, tridecoic, myristic, palmitic, margaric, stearic, oleic, linoleic, linolenic, monodicylic, arachidic, lignoceric, caranaubic and the like, although rosin acid soaps are also effective. The metals used in forming the soap are usually the metals of Group II of the Periodic Table of Elements such as zinc, magnesium, strontium, cadmium, barium, and calcium, although aluminum soaps are also effective for the present purposes. Suitable soaps include calcium stearate, zinc linoleate, magnesium oleate, barium laurate, aluminum palmitate, calcium oleate, cadmium manganate, strontium linolenate and the like.

The Group I metal soaps and ammonium soaps are not particularly hydrophobic and therefore are not generally employed for the present purposes.

The mixtures can be prepared by simply mixing finely divided particles of the soap with the vehicle at room temperature to form a slurry. Alternatively, a dispersion or suspension can be formed by mixing the fatty acid soap with a hydrocarbon vehicle at elevated temperatures. Under these conditions a gel-like dispersion is formed.

The mixture can be applied to the ceramic body by conventional techniques including dipping, spraying, and brushing. In a preferred embodiment of the present process, the mixture is applied to the edges of pressed clay tile. This treatment of the edges (sometimes referred to as the edge-coating step, for convenience of description) can be readily accomplished by gently flowing a stream of the mixture against the tile edge or by contacting the edge with a soft brush, roller or sponge which is saturated with the treating mixture. Because the glaze slip overrun deposit is usually randomly produced and is present on every edge of the pressed tile, it is necessary to treat the entire edge surface.

When the mixture is applied to the ceramic body the particles appear to accumulate at the porous surface of the body and do not permeate into the body, thus eliminating the undesirable evolution of combustion product within the body upon firing.

After the mixture has been applied, the pressed clay body is coated with an aqueous slip during which the planar surface of the pressed tile is coated with the glaze slip. Any slip overrunning the treated edge does not adhere thereto.

The tiles are then fired and the glaze is vitrified. During firing, the hydrophobic coating is burned away leaving a trace of a metal oxide residue. The fatty acid soap readily oxidizes to carbon dioxide, water, and the corresponding metal oxide. The corresponding metal oxide residue is in very minute amounts and is unnoticeable on the ceramic surface.

The following examples will show how the invention can be practiced, although they should not be construed as limiting. All parts are parts by weight and all percentages are weight percentages unless otherwise indicated.

EXAMPLE 1

Preparation of the coating slurry

A slurry is prepared by vigorously mixing 15 parts of calcium stearate with 100 parts of naphtha. The naphtha is a volatile petroleum distillate fraction having a flash point of about 20° F. (T.C.C.), a specific gravity of about 0.75 and a distillation range of about 190° F. (I.B.P.) to 400° F. (Dry Point) at atmospheric pressure. The calcium stearate is a technical grade in particulate form having a particle size of about 5 to 10 microns.

The slurry formed settles on standing after about 15 to 20 minutes, and is readily "reslurried" with mild agitation.

EXAMPLE 2

Preparation of unfired ceramic tiles

Pressed clay articles of the formulae listed below are prepared by blending the formulary ingredients in the amounts set forth in Table I below in a double cone blender and then incorporating sufficient water (e.g., from about 6 to about 7 weight percent) to form a mixture which would hold together when the formulae are pressed in a clay tile mold at between 1000 and 2000 p.s.i.

TABLE I

| Ingredient | Formula 1, percent | Formula 2, percent | Formula 3, percent |
|---|---|---|---|
| Talc (New York) | 70.0 | | 58.0 |
| Wollastonite | | 55.0 | 5.0 |
| Ball clay | 30.0 | 30.0 | 30.0 |
| Flint | | 15.0 | |
| Frit No. 4* | | | 7.0 |

* See table III for the formula of Frit No. 4.

EXAMPLE 3

Preparation of aqueous glazing slip compositions

Three aqueous glazing slip compositions are prepared by milling 100 parts of each of the three formulations listed in Table II with 40 parts of water to form an aqueous suspension. The milling is continued until the particles are of a size such that less than 5% are retained on a 325 mesh screen. The resulting glaze slip compositions are then adjusted to a specific gravity of 1.75 by adding additional water.

TABLE II.—GLAZE SLIP FORMULATIONS

| Ingredient | Formula 1 (Partially Fritted Glaze) percent | Formula 2 (All Fritted Glaze) percent | Formula 3, percent |
|---|---|---|---|
| Frit No. 1 | 19.5 | | |
| Frit No. 2 | | 88.0 | |
| Frit No. 3 | | | 78.0 |
| Feldspar | 28.4 | | |
| Flint | 8.7 | | |
| Clay | 8.9 | 3.0 | |
| Zinc oxide | 9.6 | | 10.2 |
| Wollastonite | 14.3 | | |
| Barium carbonate | 1.0 | | |
| Opacifier | 9.6 | 9.0 | *11.8 |

* Zirconium silicate.

The frit compositions employed in the glaze formulations are commercially known and have the compositions shown in Table III below.

TABLE III.—FRIT FORMULAE

[Dry Basis]

| Ingredient: | Frit No. 1, percent | Frit No. 2, percent | Frit No. 3, percent | Frit No. 4, percent |
|---|---|---|---|---|
| $K_2O$ | | 0.3 | 2.0 | 1.7 |
| $Na_2O$ | 8.5 | 3.6 | 1.9 | 14.7 |
| $CaO$ | 17.0 | 4.5 | 5.7 | 0.1 |
| $PbO$ | | 31.0 | 28.7 | |
| $Al_2O_3$ | 5.0 | 3.4 | 3.8 | 3.6 |
| $B_2O_3$ | 18.7 | 13.0 | 13.2 | 28.9 |
| $SiO_2$ | 50.0 | 43.5 | 41.2 | 51.0 |
| $ZrO_2$ | | 1.0 | 1.2 | |
| F | | | 2.3 | |

EXAMPLE 4

Application of aqueous glaze slip to unfired ceramic tiles by the waterfall method using the hydrophobic edge coating Several of the green (undried and unfired) pressed tiles of each formulae described in Table I are glazed as follows. The tiles are placed in series on a continuous movable belt. The movable belt conveys the tiles past a first treating station where a small stream of the calcium stearate/naphtha mixture prepared in Example 1 is gently directed against the tile edges. The stream is produced by pumping the mixture through a one quarter inch diameter nozzle positioned about one inch from the tile edge.

The edge coated tiles are then conveyed to a second treating station where a waterfall of the glaze slip of Formula 1 of Table II flows over the tiles. After passage through the waterfall it is observed that the edges of the tiles are not coated by the overrunning glazing slip and only the smooth top surface of the tile has a glaze deposit thereon.

Thereafter, the titles are placed in a conventional glazing furnace and heated at a temperature of about 2,000° F. over a 16 hour period and are maintained at 2000° F. for about 2 hours. The tiles are then cooled in the furnace, removed, and examined. All of the tiles exhibit an even adherent glazed surface and there is no indication of any damage to, or glazing of the edges.

EXAMPLE 5

The procedure of Example 4 is repeated except that instead of flowing the hydrophobic treating mixture onto the edges, the edges are treated by contacting the edges with a soft sponge impregnated with the mixture. After waterfall contact of the tiles with the glaze slip Formulation 2 from Table II, and firing the tiles as described in Example 4, substantially the same results are obtained.

EXAMPLE 6

A slurry is prepared by vigorously mixing 20 parts of zinc laurate with 80 parts of kerosene at room temperature. The zinc laurate is a technical grade and has a particle size of about 20 microns. The kerosene can be described as a petroleum fraction higher boiling than gasoline and lower boiling than the oils, having a flash point of about 150° F. and a distillation range of about 370° F. (I.B.P.) to about 500° F. (dry point).

The slurry thus prepared settles upon standing in about 15–20 minutes, and is readily "reslurried" with mild agitation.

EXAMPLE 7

Several of the tiles prepared in Example 2 are coated and fired by the method of Example 4 except that the mixture prepared in Example 6 is used in place of the mixture prepared in Example 1. All of the tiles produced exhibit an even, adherent glazed surface and there is no indication of any damage to, or glazing of the edges.

Having thus described the invention, what is claimed is:

1. In a process for glazing a ceramic body to form a preferentially glazed ceramic article having a first surface area to remain unglazed and a second surface area to become glazed, wherein the entire second surface area and at least a portion of said first surface area are contacted with an aqueous glazing slip, the improvement which comprises;

applying to said first surface area a mixture of finely divided, discrete, substantially combustible, hydrophobic particles in a non-aqueous, fugitive vehicle therefor to deposit and accumulate said discrete particles in the form of a hydrophobic coating on said first surface area, contacting the entire second surface area of said body and at least a substantial fraction of said first surface area with an aqueous glazing slip whereby a deposit of said slip adheres to said second surface area and is repelled by said at least substantial fraction of said first surface area, and firing the resulting treated body to form said preferentially glazed ceramic article.

2. The process of claim 1 wherein said ceramic body is in the green or unfired state.

3. The process of claim 2 wherein said mixture comprises a $C_{12}$ to $C_{26}$ monocarboxylic acid soap of aluminum or group II metal in a fugitive, normally liquid, hydrocarbon vehicle having a boiling point temperature or a dry point temperature not substantially in excess of 500° F.

4. The process of claim 2 wherein said ceramic body is a ceramic tile and said first area comprises the tile edges, and said second area comprises a planar surface of said tile and said aqueous glaze slip flows over said second surface area.

References Cited
UNITED STATES PATENTS

| | | | |
|---|---|---|---|
| 3,291,706 | 12/1966 | Gebel | 117—5.5 |
| 1,073,129 | 9/1913 | Horn | 117—123 |

ALFRED L. LEAVITT, Primary Examiner

M. F. ESPOSITO, Assistant Examiner

U.S. Cl. X.R.

117—38, 123, 125; 106—243